United States Patent [19]
Lin

[11] Patent Number: 5,457,888
[45] Date of Patent: Oct. 17, 1995

[54] FRUIT CUTTER

[76] Inventor: Shui C. Lin, P.O. Box 82-144, Taipei, Taiwan

[21] Appl. No.: 296,484

[22] Filed: Aug. 26, 1994

[51] Int. Cl.[6] .................................................. A47J 25/00
[52] U.S. Cl. ................................ 30/113.3; 30/316; 99/542
[58] Field of Search ............................. 30/314, 315, 316, 30/113.3, 113.1, 128, 130, 301, 302, 303; 99/542, 544, 545

[56] References Cited

U.S. PATENT DOCUMENTS

| | | | |
|---|---|---|---|
| 1,848,985 | 3/1932 | Yahn | 30/316 |
| 3,540,503 | 11/1970 | McNair | 30/301 |
| 4,246,700 | 1/1981 | Coulon et al. | 99/545 |
| 4,690,047 | 9/1987 | Balzano | 99/542 |

*Primary Examiner*—Hwei Siu Payer
*Attorney, Agent, or Firm*—Alfred Lei

[57] ABSTRACT

A fruit cutter including a tubular body formed at an upper inner side with a pair of L-shaped grooves, a handle having a cylindrical lower portion provided with a pair of protuberances each engaged with one of the L-shaped grooves of the tubular body, a guide plate slantwise fitted at a lower part of the tubular body, an upper positioning member slantwise fitted at a lower part of the tubular body and arranged opposite to the guide plate, a lower positioning member slantwise fitted at a lower part of the tubular body under the upper positioning member, and a cutting member slidably engaged between the upper and the lower positioning members.

3 Claims, 3 Drawing Sheets

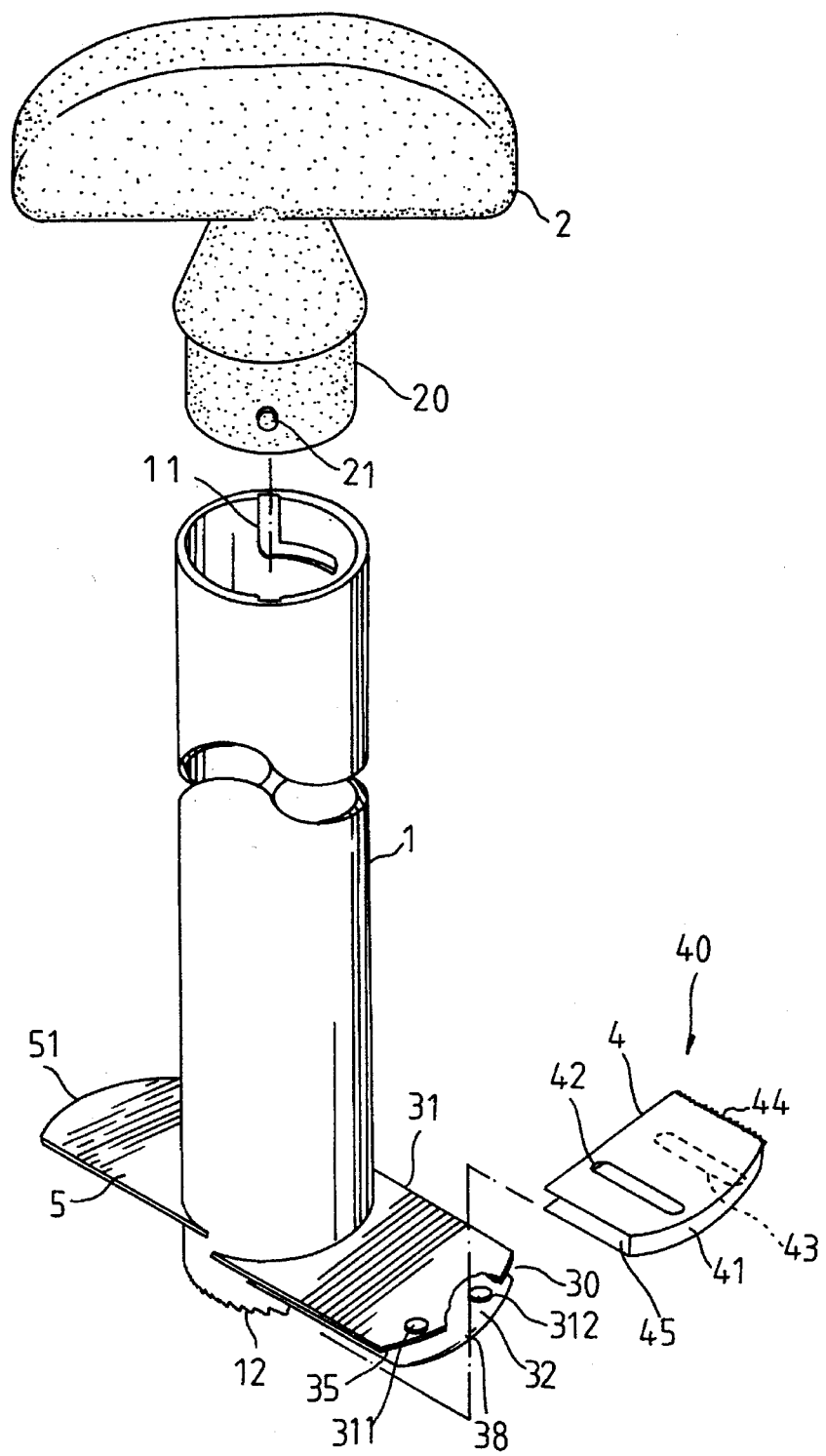
F I G. 1

1

FRUIT CUTTER

BACKGROUND OF THE INVENTION

It has been found that many attempts have been made to provide a tool for separating a core, a rind and fresh of a fruit, in particular a pineapple. In U.S. Pat. No. 5,157,836 to Aulbers et al, a tool for separating a core, a rind and flesh of a fruit is disclosed. However, the flesh cutter of such a tool is fixed and cannot be adjusted to adapt to pineapples with different sizes thereby causing it inconvenient in use.

Therefore, it is an object of the present invention to provide a fruit cutter which can obviate and mitigate the above-mentioned drawback.

SUMMARY OF THE INVENTION

This invention relates to an improved fruit cutter.

It is the primary object of the present invention to provide a fruit cutter which can be used to separate the core, the rind and the fresh of a fruit at the same time.

It is another object of the present invention to provide a fruit cutter which can be adjusted for use with fruits with different sizes.

It is still another object of the present invention to provide a fruit cutter which can be rotated in one direction only thereby preventing it from being misused.

It is still another object of the present invention to provide a fruit cutter which is easy to use.

It is a further object of the present invention to provide a fruit cutter which is simple in construction.

The other objects and merits and a fuller understanding of the present invention will be obtained by those having ordinary skill in the art when the following detailed description is read in conjunction with the accompanying drawings wherein like numerals refer to like or similar part.

BRIEF DESCRIPTION OF THE DRAWINGS

FIG. 1 is an exploded view of the present invention;

DETAILED DESCRIPTION OF THE PREFERRED EMBODIMENT

Figure 2:
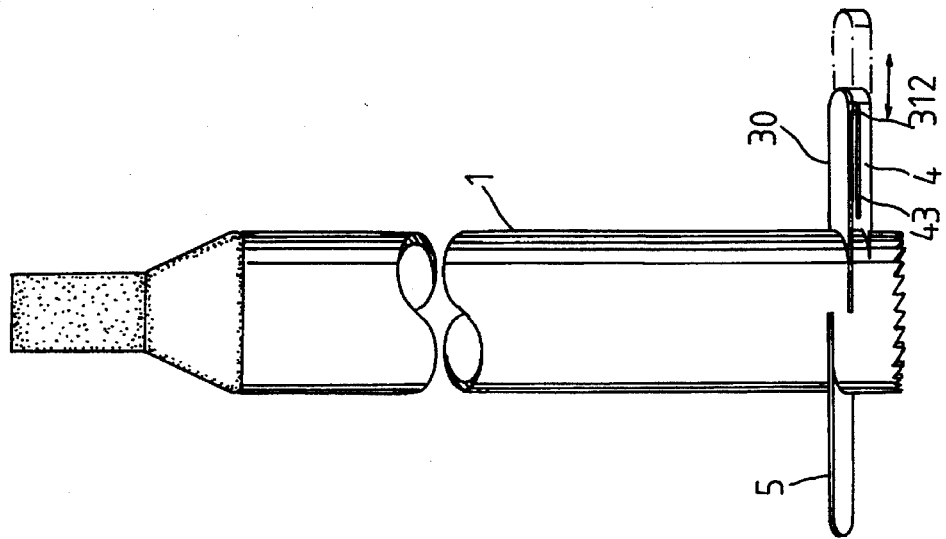
FIG. 2 is a working view of the present invention.

For the purpose of promoting an understanding of the principles of the invention, reference will now be made to embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

With reference to the drawings and in particular to FIG. 1 thereof, the fruit cutter according to the present invention mainly comprises a tubular body 1, a handle 2, a guide plate 5, an upper positioning member 31, a lower positioning member 32, and a cutting member 40.

As illustrated, the tubular body 1 is formed at the upper inner side with two opposite L-shaped grooves 11 and at the lower end a plurality of teeth 12. The handle 2 has a lower cylindrical portion 20 provided with a pair of protuberances 21 each engageable with a L-shaped groove 11 of the tubular body 1 so that the handle 2 will be firmly engaged with the tubular body 1 when turned clockwise, but will be disengaged with the tubular body 1 when turned counterclockwise.

The guide plate 5 which has a curved end 51 is fitted at the lower end of the tubular body 1 in a slanting manner.

The upper positioning member 31 has a width equal to the outer diameter of the tubular body 1. Further, the upper positioning member 31 is provided with a curved end 35, a projection 311 downwardly depending from the bottom thereof, and a toothed portion 33 at one side. In addition, the upper positioning member 31 is fitted at the lower end of the tubular body 1 in a slanting manner and arranged opposite to the guide plate 5.

The lower positioning member 32 is slightly narrower than the upper positioning member 31 and has a curved end 38. Further, the lower positioning member 32 has a projection 312 upwardly extending from the top thereof and a toothed 33 at one side. Moreover, the lower positioning member 32 is slantwise fitted at the lower end of the tubular body 1 under the lower positioning member 31 thereby forming a space 30 between the upper positioning member 31 and the lower positioning member 32.

Figure 4:
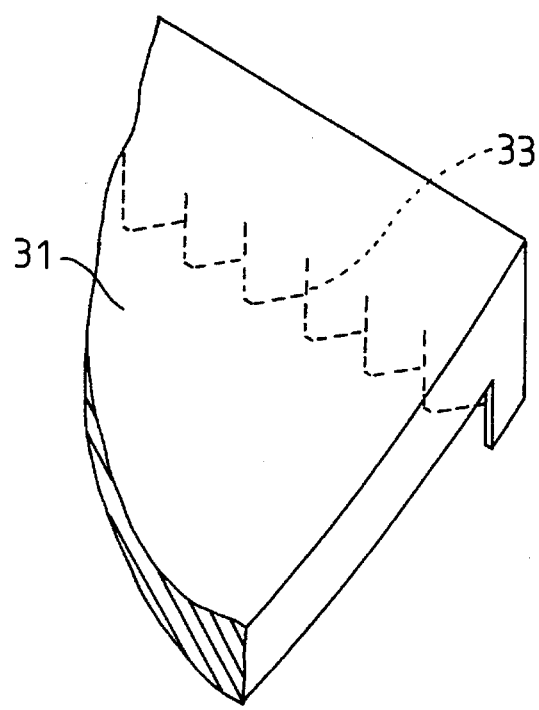
FIG. 4 is an enlarged fragmentary view of the upper positioning member.
Figure 5:
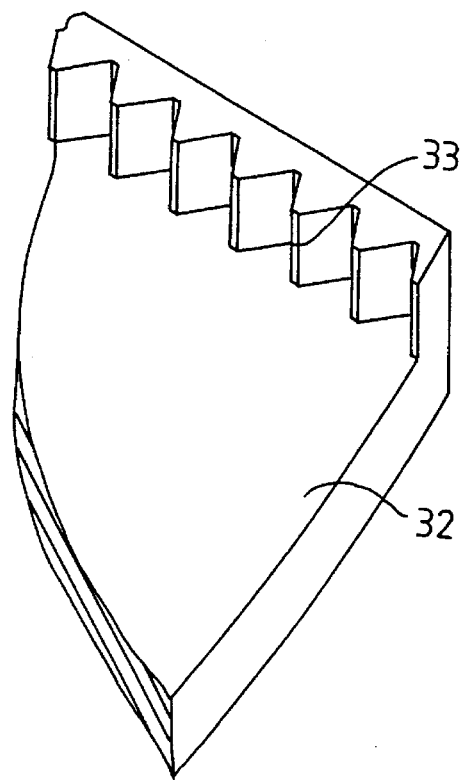
FIG. 5 is an enlarged fragmentary view of the lower positioning member.

The cutting member 40 includes an upper plate 4 having a slot 42 slidably engaged with the projection 311 of the upper positioning member 31 and a lower plate 45 having a slot 43 slidably engaged with the projection 312 of the lower positioning member 32, and a spine 41 between the upper plate 4 and the lower plate 45. Further, the upper plate 4 and the lower plate 45 are provided with a toothed edge 44 against the toothed portion 33 (see FIGS. 4 and 5) of the upper and lower positioning members 31 and 32 so that the cutting member 40 can be kept at a fixed position.

Figure 3:
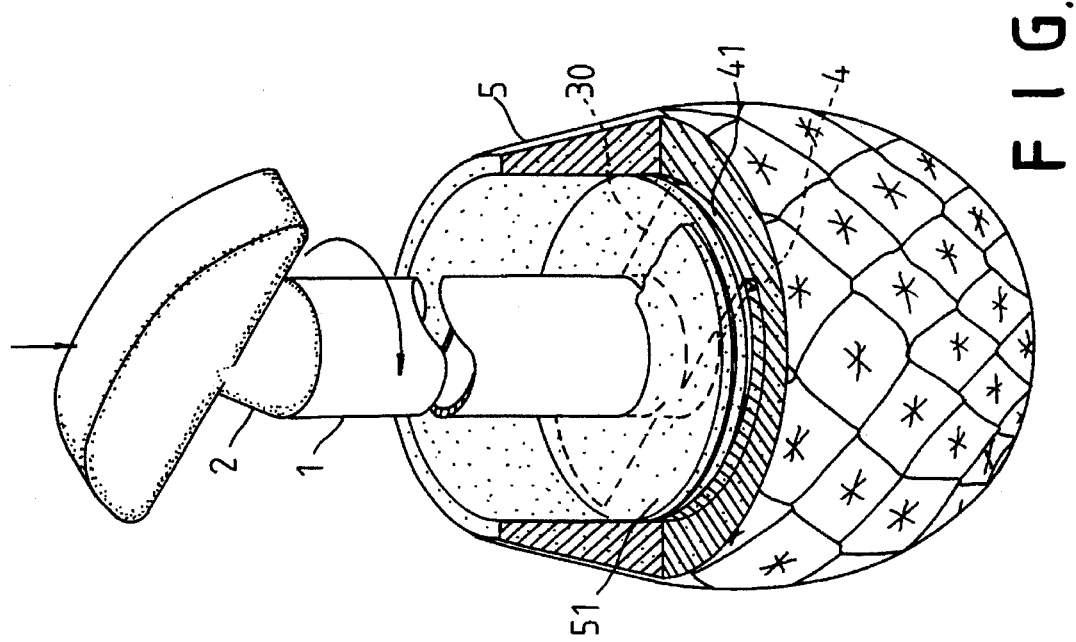
FIG. 3 is a side view of the present invention.

FIGS. 2 and 3 show the working principle of the present invention. As illustrated, the cutting member 40 can be pulled out or pushed into the space 30 between the upper and lower positioning members 31 and 32 thereby enabling the cutting member 40 to be adapted for use with fruits with different sizes.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A fruit cutter comprising:

a tubular body formed at an upper inner side with a pair of L-shaped grooves;

a handle having a cylindrical lower portion provided with a pair of protuberances each engaged with one of the L-shaped grooves of said tubular body;

a guide plate slantwise fitted at a lower part of said tubular body;

an upper positioning member slantwise fitted at said lower part of said tubular body and arranged opposite to said guide plate, said upper positioning member being provided with a first projection downwardly depending from a bottom side thereof;

a lower positioning member slantwise fitted at said lower part of said tubular body under said upper positioning member, said lower positioning member being provided with a second projection upwardly extending from a top side thereof; and a cutting member including an upper plate having a first slot slidably engaged with the first projection of said upper positioning member, a lower plate having a second slot slidably engaged with the second projection of said lower positioning member, and a spine formed between said upper plate and said lower plate.

2. The fruit cutter as claimed in claim 1, wherein said tubular body is provided with a plurality of saw teeth at a lower end.

3. The fruit cutter as claimed in claim 1, wherein said upper positioning member and said lower positioning member each has a toothed portion at one side thereof, and the upper plate and the lower plate of said cutting member are provided with a toothed edge against said toothed portion.

* * * * *